(12) United States Patent
Shen et al.

(10) Patent No.: US 7,873,702 B2
(45) Date of Patent: Jan. 18, 2011

(54) DISTRIBUTED REDUNDANT ADAPTIVE CLUSTER

(75) Inventors: Sudy Shen, Richmond Hill (CA); Cristian Saceanu, Thornhill (CA)

(73) Assignee: Masstech Group Inc., Ontario (CA)

( * ) Notice: Subject to any disclaimer, the term of this patent is extended or adjusted under 35 U.S.C. 154(b) by 855 days.

(21) Appl. No.: 11/732,020

(22) Filed: Apr. 2, 2007

(65) Prior Publication Data

US 2007/0233953 A1 Oct. 4, 2007

Related U.S. Application Data

(60) Provisional application No. 60/787,889, filed on Mar. 31, 2006.

(51) Int. Cl.
G06F 15/16 (2006.01)
(52) U.S. Cl. ........................ 709/218; 709/226; 709/249
(58) Field of Classification Search ................ 709/217, 709/218, 223, 226, 249; 370/216
See application file for complete search history.

(56) References Cited

U.S. PATENT DOCUMENTS

2004/0153749 A1 * 8/2004 Schwarm et al. .............. 714/11

* cited by examiner

Primary Examiner—David Lazaro
(74) Attorney, Agent, or Firm—Oppenheimer Wolff & Donnelly LLC

(57) ABSTRACT

Efficiency in the operation of a data archive and media life cycle management system is achieved by utilizing multiple system cores to avoid potential failures and appropriately distribute activities, along with multiple communication channels for efficiently moving information. The two system cores operate in a redundant system fail-over mode, thus insuring continuous operation. The two communication channels include different operating characteristics, one cable of low cost communication, while the other capable of higher cost/higher data rate communication. In the application where large amounts of data are moved between components, efficiency is achieved by having the higher cost/higher data rate network move this large amount of information, while the lower data rate/lower cost communication system allows instructions to easily be communicated, thus coordinating operations of the overall system.

19 Claims, 7 Drawing Sheets

DISTRIBUTED REDUNDANT ADAPTIVE CLUSTER

CROSS REFERENCE TO RELATED APPLICATIONS

This application claims the benefit of Provisional Application No. 60/787,889 filed Mar. 31, 2006.

BACKGROUND OF THE INVENTION

The present invention generally relates to the storage and retrieval of electronic data in a computer managed data archive. More specifically, the present invention provides for the efficient storage and retrieval of audio and video data suitable for distribution over a broadcasting network in a media lifecycle management system.

Broadcast facilities employ a wide variety of electronic equipment to receive, process and transmit audio-visual content to audiences. A key component in a broadcast content delivery system is a data storage archive and media lifecycle management system where audio-visual content is stored both before and after it is transmitted for broadcast. Data storage archives can include a wide variety of storage media and associated hardware such as magnetic tape, optical disk and hard disk drive arrays. The various data storage devices used within a broadcasting facility are interconnected, via a computer network, to supply devices which receive data from external sources. Examples of these supply devices includes production equipment which prepare and edit broadcast material and video servers which are used to play-out material to broadcast transmitters. A distinguishing characteristic of a data archive and media lifecycle management system, compared with a typical computer network, is the tremendous amount of data that constitutes broadcast quality video when it is converted to a digital form and the ongoing need for transporting such large volumes of data among various devices within the system in a timely manner.

The various storage hardware and media have different performance and cost characteristics which often determines how they are used within a broadcast content system. Video servers, which feature high data transfers speeds and are relatively expensive, are used as play-out devices to transfer electronic video data to broadcast transmitters. On the other end of the performance/cost spectrum are analog magnetic tapes which are inexpensive but limited in data access speed. There is a similar trade off in performance versus cost for the data channels and associated transmission protocols which are used to connect the various storage devices with each other. Also, trade-offs exist for the types of connections used to interconnect to the computer(s) which control the overall broadcast content management system. At the low end of the spectrum of performance is ethernet cable used in standard computer networks to connect network servers to client workstations which is readily available at low cost. A typical high performance data channel technology is a fiber channel, which is faster but commensurately more expensive. Based on these options/trade-offs, it is desirable to construct a data archive and media lifecycle management system with an optimal blend of performance and cost for both data storage and data transmission hardware.

In addition to employing a cost effective architecture of storage and transmission hardware, the media lifecycle management systems must also be reliable and flexible. Broadcast content typically includes both program content for audiences as well as commercial advertising which is a major source of revenue for broadcasters. Any system down time will negatively impact a broadcaster's immediate revenue as well as their reputation with audience members. It is important therefore that the media lifecycle management system be reliable and robust on both a component level as well as on an overall system level. This includes a consideration of the future growth and maintenance of the system. The ability to make changes to the system, without interruption in operation, is especially important at a time like today when rapid advances are being made in computer and related digital storage technologies.

In a Referring now to FIG. 1, a prior art data archive and media lifecycle management system 1 is shown schematically. This system illustrates the traditional approach to media data management that has been employed to date. The system is comprised of various components which cooperate to perform the tasks of storing, indexing, searching, and retrieving data as needed in day to day operations. A centralized system core 2 contains software which communicates with and controls external data storage devices such as a digital video and/or media servers (DVS) 6, a system memory cache 7, and a media library 8. The media library is shown having a number of separate memory modules which represent an organized plurality of devices such as magnetic tape drives, hard disk drives, optical drives, holographic drives or any other suitable data storage devices. System core 2 is also connected to an external database 3, which contains a searchable index of the storage locations of all data stored by the system. Typically the index records in the database will contain descriptive metadata related to the data stored on the various external storage components 6-8. In addition, database 3 contains an active database of the configuration of the data archive and media lifecycle management system 1 as well as operation and status logs. The system core 2 is connected to the various external components through two separate data channels. The dashed lines 9 represent internet protocol (IP) infrastructure and could be either Ethernet or GigEthernet which are capable of data transfer rates of 10-100 Mbits/sec for the former and 1 Gbit/sec for the latter. The solid lines 10 represent Fiber Channel (FC) which have a significantly higher data transfer capacity in the range of 1-4 Gbits/sec. Expected advances in FC technology will lead to yet higher data transfer capacities of 8 Gbits/sec within several years and a further increase to 16 Gbits/sec several years after that.

Several approaches to data storage and media lifecycle issues have been developed in the past. Several of these include:

U.S. Pat. No. 4,296,465 discloses a method of moving substantial blocks of data from an I/O buffer or disk cache buffer disk (external) memory to working processor memory for use by a program running in the computer system. The method involves the use of an autonomous hardware device, a so-called data mover, to affect the transfer of data. The data mover can receive and store instruction words and data words and is provided with the necessary registers, counters, switches and digital logic circuits so that it can issue appropriate memory retrieval and storage (read and write) instructions. The data mover is provided with a throttle to minimize potential conflicts with other components of the data processing system. It is designed so that its read and write instructions overlap each other, significantly increasing the rate of data transfer. The data mover relieves the control processors of the data processing system of the responsibility of moving blocks of data from the I/O buffer to the working store thereby significantly increasing the rate of data transfer.

U.S. Pat. No. 5,091,849 describes a computer image production system that features computer workstations connected to data image storage devices which contain image data that is retrieved and processed by the workstations. The workstations are connected to the storage devices by two separate communication networks; a first network for sending and receiving system logistics and control information to the data storage devices and a second network for transferring data files from storage to the workstations and vice versa.

U.S. Pat. No. 5,860,026 involves a method of transferring data between clusters in a system comprising a plurality of clusters by issuing data transfer instructions from a first cluster which are carried out by a data transfer processing unit on a second cluster without having to use a main data processor in the second cluster. This allows the system to transfer data between clusters without compromising the general data processing ability of clusters affected by the data transfer.

U.S. Pat. No. 5,917,723 discloses a method of mirroring write request data from a first device to a second device where the second device has a primary and a secondary processor. Variable length control data is included in the data stream to the second device and is received by the secondary processor which reads and executes the control data without requiring a hardware interrupt of the primary processor of the second device.

U.S. Pat. No. 5,944,789 involves a network file server consisting of a cached disk array and a plurality of data mover computers for providing access to data files stored in the cached disk array. The data movers perform file system tasks such as mapping file names to logical data blocks, and the locking and unlocking of data files to minimize the loading on the cached disk array. Each data mover maintains a local cache of the file directory software including locking information of locked files that are accessible through the data mover. Data transfers may use more than one data mover simultaneously to expedite the transfer of data from the cached disk array to a client computer. A cache consistency scheme ensures that file locking information is consistent among the local caches of the plurality of data mover computers.

U.S. Pat. No. 6,324,581 describes a file server system in which a plurality of data mover computers control access to data stored on respective data storage devices. A network client can access data stored in the system through any of the data movers. If a data mover receives a request for data whose access is controlled by another data mover, the second data mover performs a lock on the requested data and sends metadata for the requested data to the first data mover computer which then uses the metadata to formulate a data access command to retrieve the requested data over a data path which bypasses the data mover computer which controls access to the requested data.

U.S. Pat. No. 6,651,130 outlines a computer system interface between a host computer/server and a storage device comprising an array of disk drives. The interface includes a plurality of front end directors coupled to the host computer server and a plurality of back end directors coupled to the array of disk drives. The interface also comprises a data transfer section containing a cache memory and a messaging network that is used to send control signals between the front and back end directors. Each director includes a data pipe for transmitting data to and from the cache memory in the data transfer section, a microprocessor, a controller and a common bus for connecting the aforementioned components. The controller manages the exchange of messages between the front and back end directors used to control the transfer of data through the data pipes to the cache memory in the data transfer section.

U.S. Pat. No. 6,735,717 describes a distributed computing clustering model which features at least two file servers each of which uses a virtual shared memory containing data objects or tuples which can be accessed independently by worker processes running on client computer devices. A state table is used to synchronize the active virtual shared memory of a first active file server with the stand-by virtual memory of the stand-by file server. In the event of a failure, the stand-by file server will become active and the worker processes will be able to access data objects or tuples in its version of the shared virtual memory.

U.S. Pat. No. 6,779,071 discloses a computer interface between a host computer/server and a storage device comprising an array of disk drives. The interface includes a plurality of front end directors coupled to the host computer server and a plurality of back end directors coupled to the array of disk drives. The interface also comprises two independent communication networks, one for transmitting control messages between the front and back end directors and a second for transmitting data through a common cache memory between the front and back end directors.

U.S. Pat. No. 6,990,606 involves a method for effecting a failover change of control from one node in a loosely connected cluster of nodes in a distributed computer environment to another candidate failover node. Configuration data for a plurality of candidate failover nodes is maintained in a data store and status messages are sent from each of the candidate failover nodes, analyzed and compared with the configuration information to determine if a failure in the current controlling node has occurred and if a failover change of control should be initiated. The method provides for a cascading failover which provides for a first failover candidate taking over only a portion of the processes of a failed control node with a second failover candidate taking over the remaining functions.

U.S. Pat. No. 7,010,575 describes a method of transferring data between a host computer and a bank of disk drives over an interface which comprises two separate communication networks connecting front end data transfer directors connected with the host computer and back end data transfer directors connected with the bank of disk drives. The interface mediates and controls the transfer of data from the host computer to the disk drives and vice versa. One of the communication networks in the interface is used to pass control messages from the front end directors to the back end directors and vice versa while the second communication network is reserved for the transfer of data only from the host computer to the disk drives or vice versa through an intermediary cache memory. The use of a separate network for messaging relieves the cache memory from the burden of storing and transmitting the control messages and improves the operation of the system. The method includes the provision of checking where messages received by a second director are from a valid first director, and if not, terminating the data transfer transaction.

U.S. Pat. No. 7,028,218 illustrates a redundant file server system which uses a plurality of processor boards each having at least 2 physical processors each of which share a cache memory, multiple functional units and a common register unit allowing each of the physical processors to be programmed to act as separate logical processors. The separate logical processors on each processor board are programmed to function as network control processors, data storage control processors and data mover processors in either an active functioning mode or in a stand-by mode ready to take over from the active processor in the event of a failure.

BRIEF SUMMARY OF THE INVENTION

The present invention is a novel hardware and software architecture for a data archive and media lifecycle management system which achieves a number of improvements over prior art systems. Specifically, the architecture and methods of the present invention provides greater efficiency in the use of resources, more flexible bandwidth management, system robustness and scalability. These improvements are especially important in data archive systems which regularly handle very large amounts of audio-visual data while maintaining extremely high standards of reliability. The above-mentioned results are achieved by using a distributed data archive system architecture which has a plurality of system cores operated as a redundant fail-over capable cluster. At least two data communication networks are included in the system, with a first network for transmitting data movement control instructions and a second network for transmitting content data. At least one data mover is connected to the core system cluster via the first communication network and to a plurality of data storage devices via the second communication network. In this way the data mover will efficiently manage data storage activities by effectively utilizing these two communication networks. In a preferred embodiment the first communication network uses low cost standard ethernet network cabling and the second communication network uses high bandwidth fiber optic channel.

As mentioned above, the system of the present invention utilizes a plurality of system cores to operate as a redundant fail-over capable cluster. This is achieved by having multiple cores which are in communication with one another, and which operate in a coordinated manner. A first core is traditionally in control of system operations, and is capable of assigning tasks related to data management and movement. A second system core, can handle certain assigned tasks, while also monitoring the operation of the first system core. Should failures be detected in any way, the second system core is capable of assuming control of system operations. At this time, modifications and adjustments to the first system core can be achieved to correct existing problems. Once operational, the first system core can then again maintain system control.

In addition, the present invention efficiently utilizes data movers to achieve the above-mentioned efficiency. System cores coordinate with multiple data movers to achieve movement of the large data files related to audio-visual data. By utilizing these separate systems, efficient use of the second communication network is achieved, thus speeding the ability to move necessary information.

BRIEF DESCRIPTION OF THE DRAWINGS

The inventive data archive and media lifecycle management system will be described below in greater detail by reference to the attached drawings

DETAILED DESCRIPTION OF THE INVENTION

Figure 1:
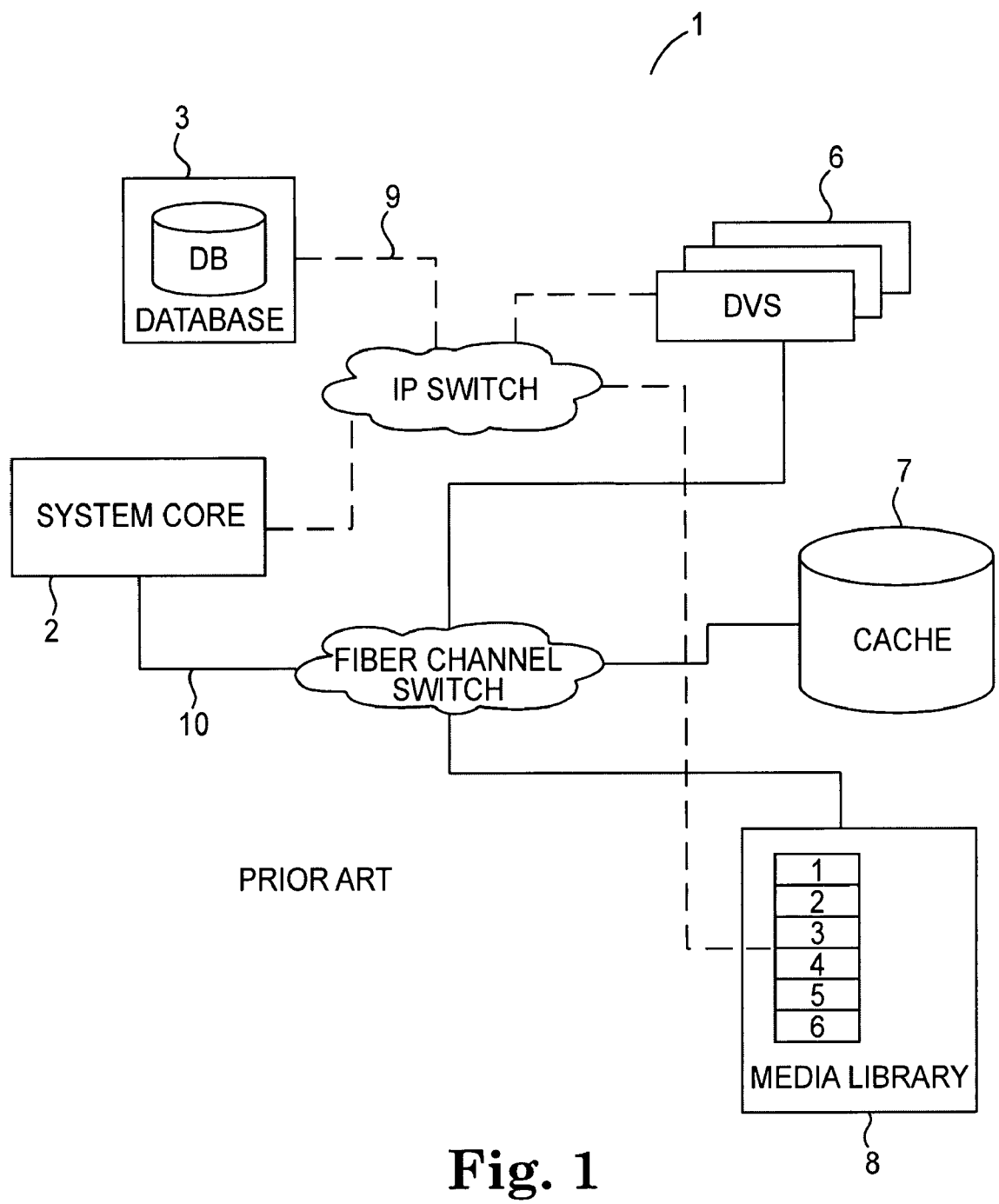
FIG. 1 is a schematic block diagram depicting the data storage archive and media lifecycle management system architecture typical of prior art systems
Figure 2:
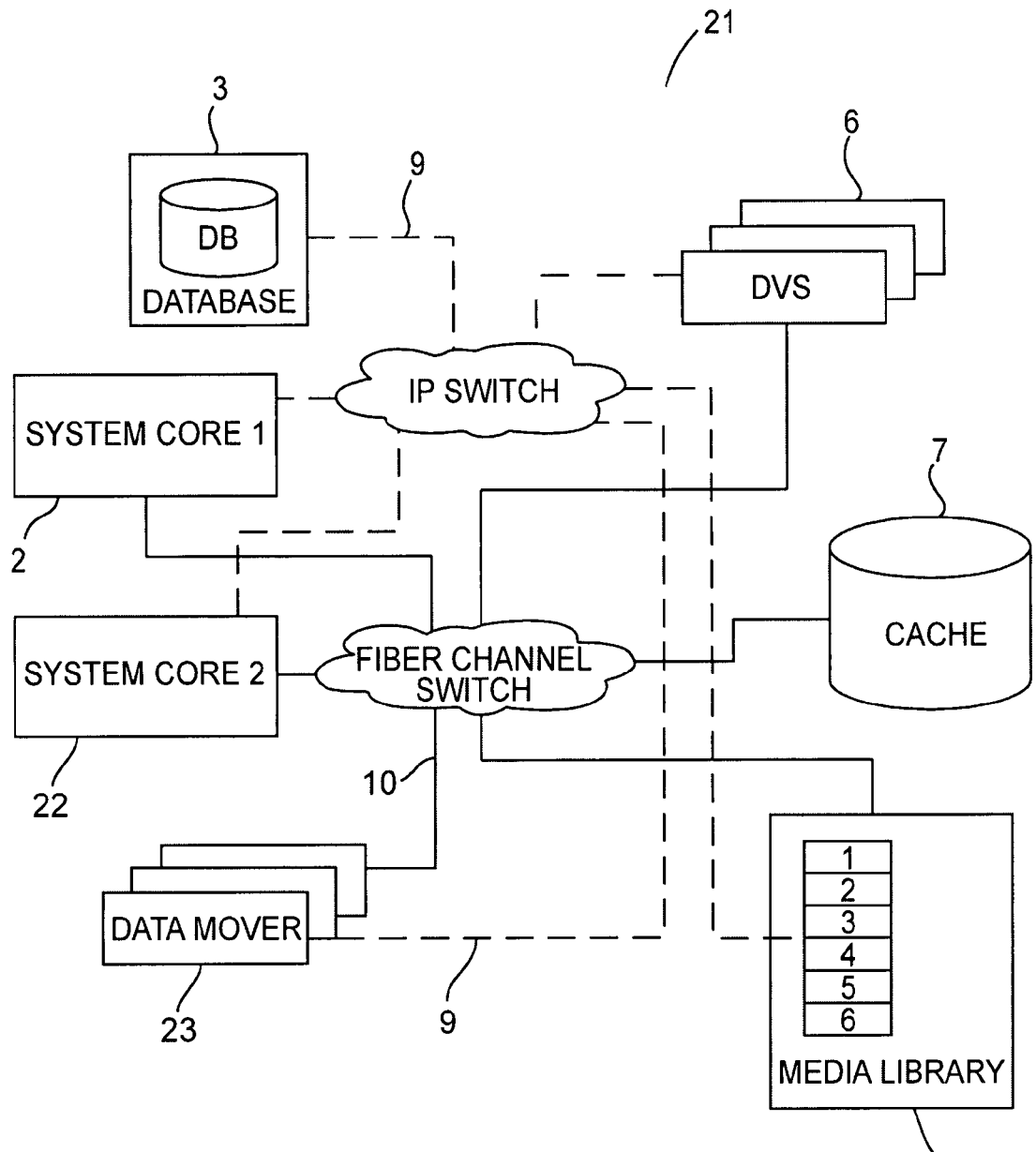
FIG. 2 is a schematic block diagram showing the system architecture of a data storage archive and media lifecycle management system in accordance with the present invention

Referring now to FIG. 2, a data archive and media lifecycle management system 21 is shown schematically which incorporates the novel features of the invention. To operate efficiently, a first system core 20 and a second system core 22 are incorporated into the system, which has connections via IP infrastructure 9 and Fiber Channel 10 to external data storage locations, including digital video and/or media servers 6, system cache 7 and media library 8. Although only two system cores are illustrated, the system is not limited to two and can in fact accommodate further additional cores as needed by the requirements of the system. The second system core 22 is connected to and communicates with the first system core 20 and the system database 3. The two system cores 20 and 22 co-operate as components of an adaptive cluster to provide system control redundancy, which greatly helps to enhance the reliability and robustness of the system. Only one of the two core systems is in active control of the data archive and media lifecycle management system 21 at any one time. The other core system continually monitors the active core system and if there are indications that the active core system is not operating correctly, the non-active core will take control of system 21 and shut down the active processes running in the previously active core system. For example, assuming first system core 20 is initially active, second system core 22 will operate to monitor activities on the system 21 until a problem is identified. At that time, second core system 22 will assume control. Once active, second core system 22 will attempt to recover first core system 20 through the initiation of various measures including restoring power and if successful, first core system 20 will then resume the role of the non-active, stand-by core system. The use of two or more identical core systems, each capable of operating in either an active or stand-by mode, greatly enhances the reliability and robustness of the system. This configuration is also advantageous in that it allows service personnel to maintain and upgrade each core system, in turn, without disrupting the operation of the data archive and media lifecycle management system. Thus the amount of system down-time from either unanticipated failure or regular maintenance is minimized by the use of multiple system cores 20, 22 operating as an adaptive cluster.

Figure 6:
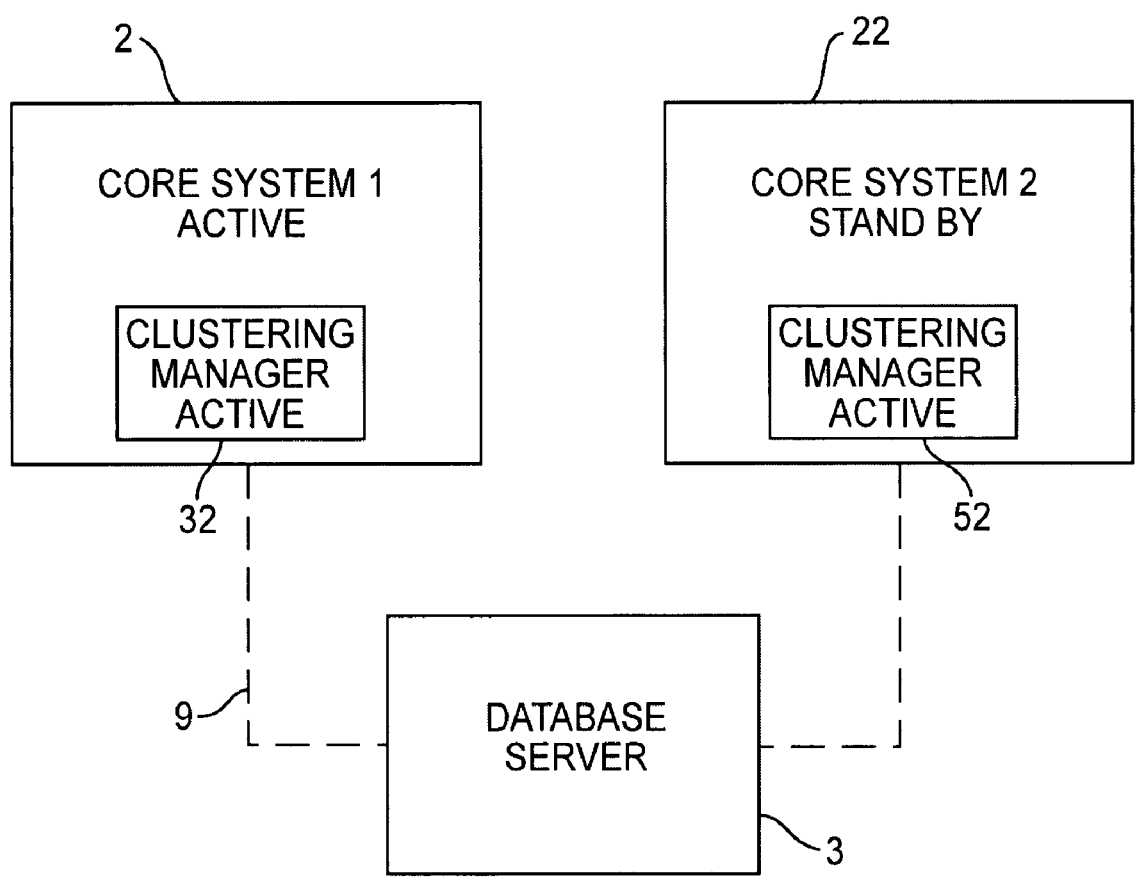
FIG. 6 is a schematic block diagram which depicts the configuration of the two core systems.

FIG. 6 depicts schematically the configuration of the two core systems, 20 and 22. Each system contains a clustering manager 32 and 52 which remains active regardless of the active or non-active status of each host core system. The clustering manager of the active core system continuously sends status data of all running processes to the external database, and the non-active core system continuously polls this data to determine if the active core system is functioning properly. If there is an indication of failure, the non-active system core executes a fail-over routine which transfers control of the archive system to it, and shuts down all application functional processes left operating on the recently failed core system. This includes shutting down all data movers and any data transfers in progress. This termination step is included in the fail-over routine to ensure that only one core system is ever in control of the system and the various external storage devices at any one time. After the termination step, the new active core initiates its other system modules and attempts to restart the previously active data transfers.

Figure 7:
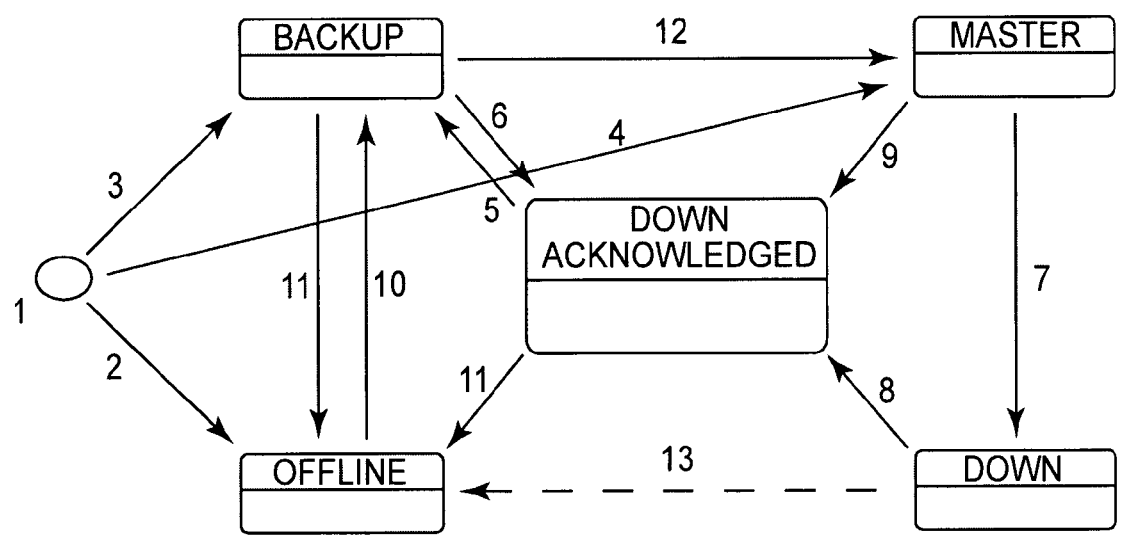
FIG. 7 is a schematic diagram illustrating the fail-over process between redundant system cores within the inventive data archive and media lifecycle management system including Table 1 which describes systems events and their effects on the current state of a system core.

The process of fail-over discussed above is illustrated schematically in more detail in FIG. 7 where the various potential states of a system core within an adaptive cluster are represented as components in a digital state machine. Table 1 accompanies FIG. 7 and describes systems events and their effects on the current state of a system core. The cluster state machine represented in FIG. 7 applies to the operation of all of the potential 1 to N system cores connected to data archive and media lifecycle management system 21. Again, the redundant system cores configured as cluster state machines ensures overall system robustness and reliability.

In data archive and media lifecycle management system 21 the transfer of data from one source or storage location to another involves two separate steps. Initially there is a preparation step which involves signaling from the first system core 20 to both the source and destination of the data to be transmitted. First core system 20 communicates with database 3 to determine the address(es) of the data to be transmitted and relays this information to the data source, then communicates with the data destination to determine which address(es) are suitable for receiving the data. First core 20 then performs endpoint preparation to ensure that both the source and destination are ready to send and receive the data. The endpoint preparation procedures vary depending upon the type of device that is involved. For example if the receiving endpoint is a tape drive, the endpoint preparation stage will involve ensuring that a tape cassette is mounted in a suitable drive and has sufficient capacity to receive the expected data. After the source and destination are thus prepared and ready to transmit data first system core 20 initiates the second step of streaming or transmitting the data.

As discussed above, prior art systems perform both the signaling and streaming of data sequentially on one type of network channel. For example first system core 20, depending on the status of the data archive and media lifecycle management system, may perform both signaling and transmission over the FC network, or conversely it may perform both operations over the IP network. The disadvantage of this is that signaling is typically a low bandwidth operation and combining it with high bandwidth data transmission over the same type of network channel is inherently inefficient. In a data archive and media lifecycle management system which exists to regularly store and retrieve very large amounts of data this inefficiency can significantly affect the overall performance and/or cost of the system.

Returning now to FIG. 2, a set of external data movers 23 are connected to data archive and media lifecycle management system 21 via both IP and FC networks. The data movers 23 are stand alone hardware components which specialize in transmitting large volumes of data specifically over high capacity data channels such as Fiber Channel(s) 10. Each of the core systems 20, 22 are enabled with software modules that perform the signaling functions for all data transfers. After the signaling process is completed control is passed to one or more independent data movers 23 for actual transmission of the data from one the source location to the destination. The separation of the data movement process into two distinct steps allows the signaling to be communicated over lower bandwidth IP channel(s) while reserving the higher performance FC channel(s) for high bandwidth data transfer. A further benefit of separating the signaling from the transmission of data is that the data movers become modular units that can be added, removed, upgraded or reconfigured at will. This flexibility allows the system to be scalable in terms of overall system bandwidth. Additionally the modular nature of the data movers allows them to be employed in groups of more than one in any particular data transfer and thus can achieve an aggregation of bandwidth resulting in faster data transmission for higher priority transfers.

Figure 3:
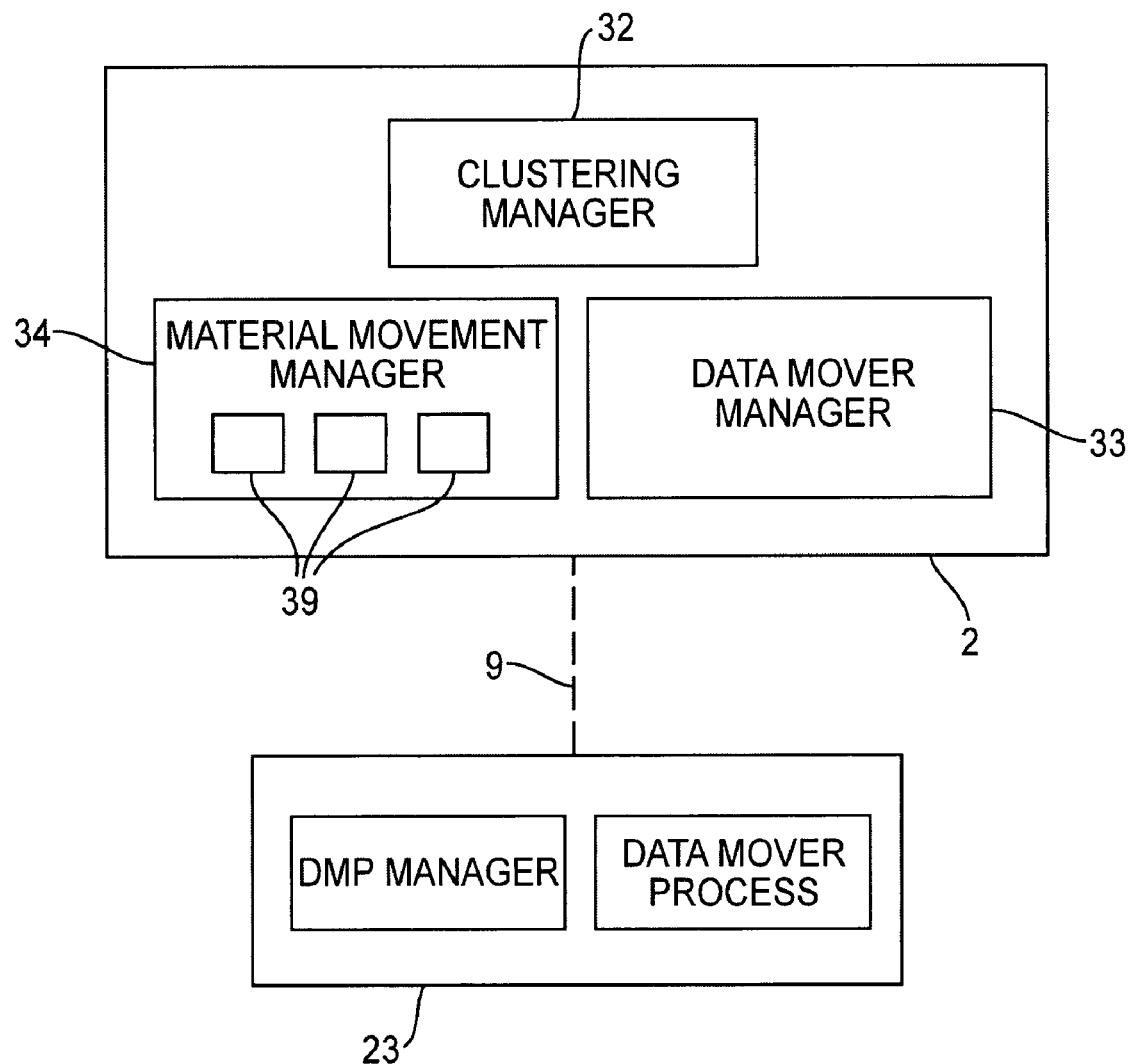
FIG. 3 is a schematic block diagram that depicts the distribution of functions and processes between a system core processor and a data mover in a preferred embodiment.

FIG. 3 schematically depicts the distribution of functions and processes in a preferred embodiment of data archive and media lifecycle management system 21. The system core 2 contains clustering manager module 32 as well as a material movement manager 34 and a data mover manager 33 and is connected via IP infrastructure 9 to an external data mover 23. Although only one data mover 23 is depicted, there can be multiple data movers 23 connected to first system core 20 as is needed by the requirements of the particular data archive and media lifecycle management system 21. Within data mover 23 are a data mover process manager 37 and data mover process 38. Data mover process manager 37 is responsible for starting and stopping the data mover process and the data mover operating system. The data mover manager module 33 manages the configuration of data movers allowing system administrators the option of adding, removing or configuring the operational parameters of the individual data movers. In addition, the data mover manager 33 monitors the functional status of each data mover and ensures that they are capable of operating. A further function of data mover manager 33 is to manage the bandwidth of the system by allocating the flow of data within the system to the most appropriate data movers. Data mover manager 33 actively monitors the flow of data and can re-route data transfers from one data mover in response to overloading or failure of specific data movers. This ability to actively respond to failures of individual data movers makes the system an adaptive one that is significantly more robust than prior art systems. The architecture of the system further allows data movers to be hot-swappable, that is, data movers can be added or removed from the system while it is operating and engaged in data transfers without affecting the system or the processes actively running on it.

Figure 4:
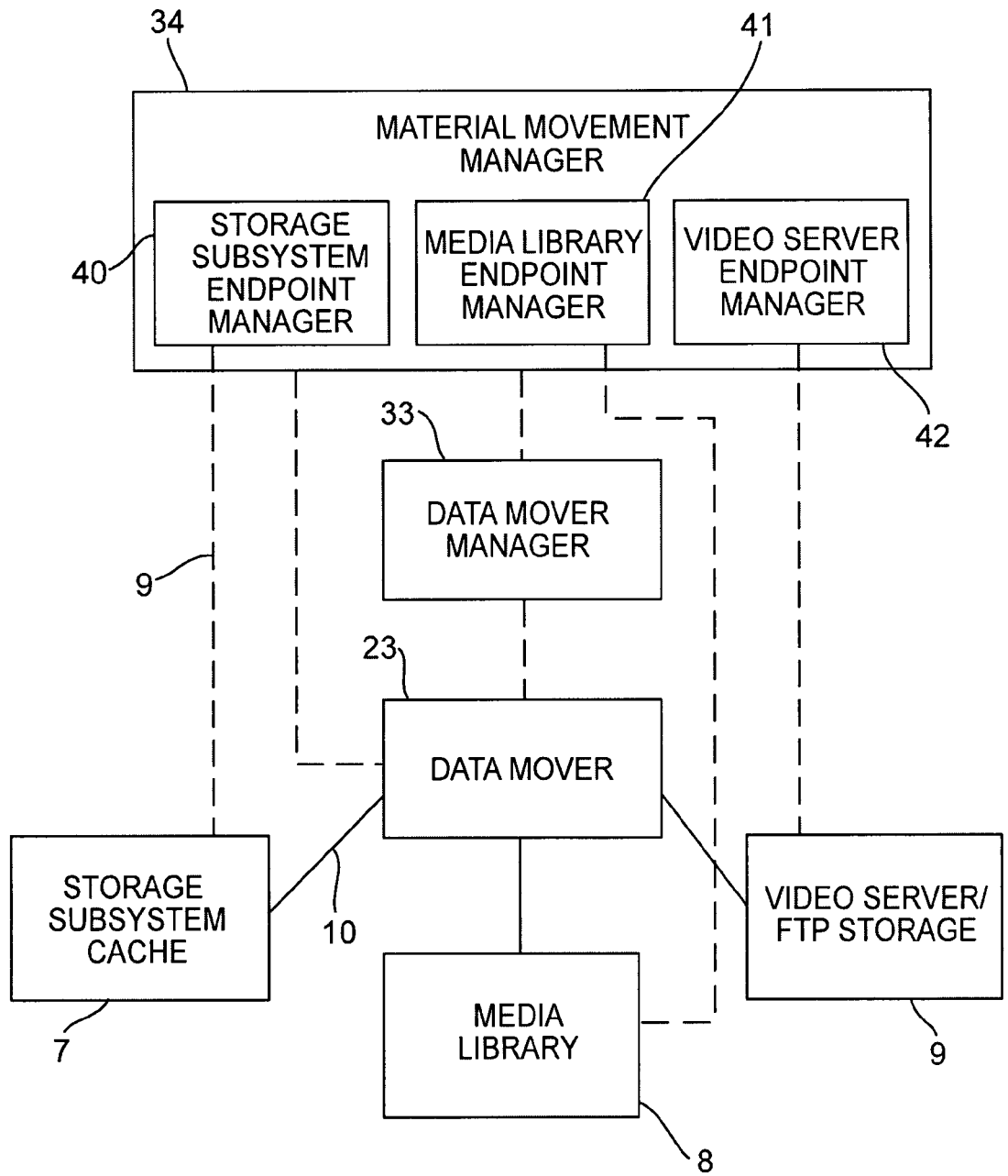
FIG. 4 is a schematic block diagram which shows the material movement manager in more detail with specific end point managers connecting to data storage devices.

The material movement manager 34 contains a number of endpoint managers 39 which communicate with and prepare the various data storage devices and servers connected to the data archive and media lifecycle management system for the transfer of data from one to another. FIG. 4 shows the material movement module 34 in more detail with specific end point managers including: a storage subsystem endpoint manager 40 which manages communication and preparation of a system cache device 7; a media library endpoint manager 41 which manages communication and preparation of media library 8; and a digital video and/or media server endpoint manager 42 which manages communication and preparation of digital video and/or media servers 6. Each endpoint manager 40, 41, and 42 communicates with its respective external device via lower bandwidth IP infrastructure 9. Also shown in FIG. 4 is the connection between the material movement manager 34 and the data mover manager 33 and its connection to an external data mover 36, both connections using lower bandwidth IP infrastructure. Data mover 23 is shown being connected to each of the external data sources/servers by high bandwidth FC infrastructure 10. Endpoint managers 40, 41, and 42 will collect information from the various storage devices such as file address, file size etc. and create a configuration object which is passed on to data mover 23 via data mover manager 33. Once data mover 23 has configuration objects for both the data source and destination, and the endpoints are prepared, it can perform the data transfer independently from the system core over high bandwidth fiber channel 10. The initiation of the data transfer starts with a signal from the material movement manager 34 to the data mover selected for the transfer by the data mover manager 33.

Figure 5:
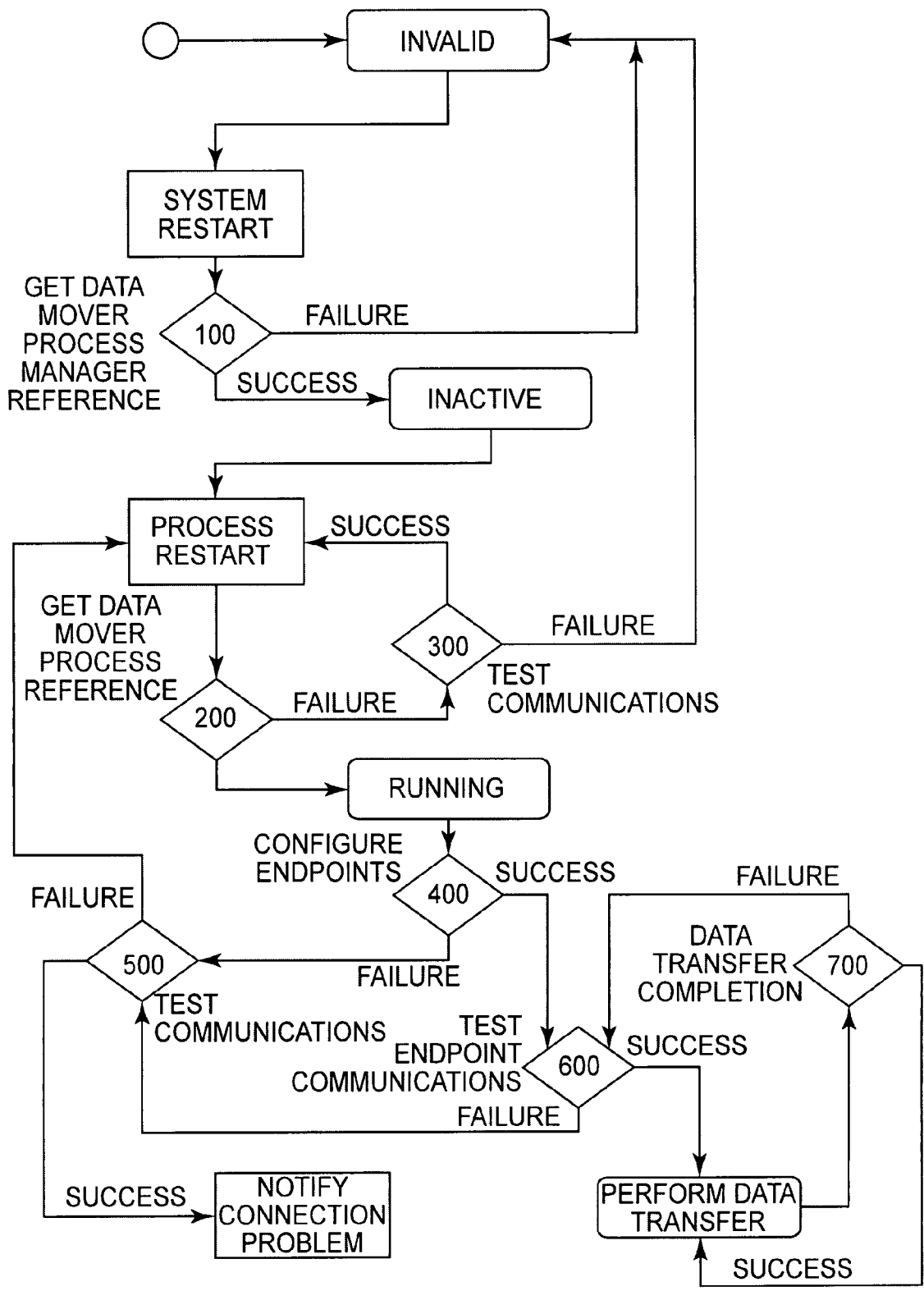
FIG. 5 is a flow chart illustrating the flow of control of a data mover in the inventive data archive and media lifecycle management system.

FIG. 5 is a flow chart illustrating the flow of control of a data mover in data archive and media lifecycle management system 21. A series of process actions and tests are conducted upon system initialization starting with step 100 which is an attempt to get a reference to the data mover process manager 37 within a data mover 23. A failure to get a reference will lead to a system restart otherwise the system will enter a running, but inactive state where it waits for a data transfer initiation. When a data transfer is initiated, a data mover process 38 is started and an attempt is made to get a process reference at step 200. A failure will lead to a test of system communications at step 300 followed by either a process or system restart. A successful retrieval of a data mover process reference leads to the next step of configuring endpoints 400. A failure will trigger another system communications test 500 followed by a system and/or process restart or a connection problem notification. A successful configuration of transfer endpoints leads to a test at step 600 of the endpoints and if successful leads to the start of a data transfer. During data transfer a transfer completion test 700 is performed to ensure that the endpoints remain connected and a failure leads to an attempt to test and/or reconfigure all the endpoints involved in the transfer or to a restart of the process and/or system if necessary. A successful transfer completion test leaves the data mover and endpoint pair ready for the next data transfer operation.

Unlike prior art systems, the system architecture of the inventive data archive and media lifecycle management system 21 allows for the separation of the data transfer process into two distinct and separate processes, each using appropriate hardware in the most efficient manner. Another benefit of this architecture is that it is easily scalable; additional data movers can be added to the system to increase overall system bandwidth if needed and the presence of a plurality of data movers provides valuable system redundancy in the event of a data mover failure. In the case of a data mover failure the data mover can be removed from the system without affecting the remainder of the system or the processes actively running on it.

Although the description of the preferred embodiment of the invention mentions specifics with regards to the type of data communication networks that are employed to transmit data movement control data and audio video content data it is contemplated that other types of data communication networks could be used without deviating from the spirit of the present invention. It is intended that the scope of the present invention be determined by the appended claims and not by the description of the preferred embodiment.

What is claimed is:

1. A distributed data archive and media lifecycle management system comprising:

a first system core and a second system core managed as an adaptive cluster with either of the first system core or the second system core being active and in control of the system at any one time, the first system core and the second system core both providing data movement control capabilities;

a plurality of data storage devices used for storing data within the system, the plurality of data storage devices connected to said first system core and second system core over a first data communication network;

a database containing system configuration data and storage location data for all data stored on the plurality of storage devices, the database connected to said first system core and second system core over said first data communication network;

at least one data mover connected to said first system core via said first data communication network and connected to said plurality of data storage devices over a second data communication network, each of said at least one data mover configured to receive storage location data and data transfer commands over said first data communication network and perform data transfers from said plurality of data storage devices over said second data communication network based on said storage location data and data transfer commands;

wherein the first system core communicates with said plurality of data storage devices over said first data communication network preparing them for writing or reading data, and wherein said first system core also communicates with said database over said first data communication network obtaining data storage address data which is transmitted to said at least one data mover over the first data communication network, thereby enabling said at least one data mover to transfer data to or from the data storage devices over the second data communication network using the data storage address data.

2. The system in claim 1 wherein the data bandwidth capacity of the second data communication network is greater than that of the first data communication network.

3. The system in claim 2 wherein the first data communication network uses a low bandwidth Ethernet data channel.

4. The system in claim 2 wherein the second data communication network uses a high bandwidth fiber optic data channel.

5. The system in claim 1 wherein the first system core and the second system core are able to monitor the functional status of each data mover active in the data archive system.

6. The system in claim 5 wherein the first system core monitors the flow of data within the data archive system and upon the existence of predetermined conditions re-routes data transfers from one data mover to another.

7. The system in claim 6 wherein the first core system is capable of adding or removing data movers from the data archive system.

8. The system in claim 1 wherein the plurality of system cores each contain clustering management capability that is active at all times.

9. The system in claim 8 wherein the clustering management capability of the active system core transmits process data on all running processes under its control to a database where it is stored and regularly polled by the active clustering management software of the non-active system cores to determine if a failure in the operation of the active system core has occurred.

10. A data archive system for the storage and management of large amounts of data, comprising:

a plurality of system cores operating as an adaptive cluster, wherein a first system core is active and in control until another of the plurality of system cores detects that the first system core is not operational, at which time a second system core of the plurality of system cores will become active and in control until the first system core is operational;

a plurality of data storage devices used for storing and archiving data provided to the data archive system;

a storage system database containing system configuration data and location data, wherein the location data indicates the location of data stored on the plurality of data storage devices;

at least one data mover for coordinating the transportation of data to and from the plurality of data storage devices;

a first communication network coordinating communication between the plurality of system cores, the storage system database, and the at least one data mover, wherein the first communication network will communicate transfer instructions indicating where data is to be stored and delivered; and a second communication network coordinating communication between the first plurality of cores, the plurality of storage devices and the data mover, wherein the second communication network is configured to transport data to and from the data storage devices based on the transfer instructions.

11. The data archive system of claim 10 wherein the second communication network has a data bandwidth capacity which is higher than the data bandwidth capacity of the first communication network.

12. The data archive system of claim 11 wherein the second communication network is a fiber channel network.

13. The data archive system of claim 11 wherein the first communication network is an Ethernet network.

14. The data archive system of claim 10 wherein the data storage device is used to store audio-visual data.

15. The data archive system of claim 10 wherein the plurality of system cores include a cluster management system in which the active system core transmits process data reporting all running processes to a cluster management database, the cluster management system regularly polling the cluster management database to determine the potential existence of a system failure.

16. The data archive system of claim 15 wherein the cluster management system is active at all times.

17. The data archive system of claim 16 wherein the cluster management system will transfer control to the second core system upon the detection of a failure by the cluster management system.

18. The data archive system of claim 10 further comprising a second data mover capable of operating in conjunction with the existing data mover.

19. A distributed data archive system comprising:

two or more system cores providing an adaptive cluster, including a primary system core performing a plurality of processes to actively manage data storage activities in the distributed data archive system, and secondary system cores configured to monitor the primary system core and actively manage the data storage activities in the distributed data archive system upon operational failure of the primary system core;

one or more data storage devices containing data stored within the distributed data archive system, the one or more data storage devices connected to the two or more system cores via a lower speed data communication network topology;

one or more databases containing storage information for data stored on the one or more data storage devices, the one or more databases connected to the two or more of system cores via the lower speed data communication network topology;

one or more data movers used for transferring data within the distributed data archive system, the one or more data movers connected to the two or more system cores via the lower speed data communication network topology and connected to the one or more data storage devices over a higher speed data communication network topology;

wherein the lower speed data communication network topology is used to communicate data storage commands and data storage information between the two or more system cores, the one or more data storage devices, the one or more databases, and the one or more data movers; and wherein the higher speed data communication network topology is used by the one or more data movers to transfer data to and from the one or more data storage devices based on the data storage commands and storage information received by the one or more data movers via the lower speed data communication network topology;

thereby enabling data commands and signaling to be transmitted over the lower speed data communication network topology, and data transfers from the data storage devices to be transmitted over the higher speed data communication network topology.

* * * * *